Oct. 1, 1968   S. M. STRAND   3,404,343
ADJUSTABLE DIGITAL PULSE DELETERS
Filed June 18, 1964   3 Sheets-Sheet 3

Fig. 6a

| SWITCHES M | | | | |
|---|---|---|---|---|
| DRAW SETTING (%) | SWITCH M | | | |
| | 1 | 2 | 3 | 4 |
| .0 | X | X | X | X |
| .1 | X | X | O | X |
| .2 | X | O | X | X |
| .3 | X | O | X | O |
| .4 | X | O | O | O |
| .5 | O | X | X | X |
| .6 | O | X | O | X |
| .7 | O | X | O | O |
| .8 | O | O | X | O |
| .9 | O | O | O | O |

Fig. 6b

| SWITCHES L | | | | |
|---|---|---|---|---|
| DRAW SETTING (%) | SWITCH L | | | |
| | 1 | 2 | 3 | 4 |
| 0 | X | X | X | X |
| 1 | X | X | O | X |
| 2 | X | O | X | X |
| 3 | X | O | X | O |
| 4 | X | O | O | O |
| 5 | O | X | X | X |
| 6 | O | X | O | X |
| 7 | O | X | O | O |
| 8 | O | O | X | O |
| 9 | O | O | O | O |

Fig. 6c

| SWITCHES K | | |
|---|---|---|
| DRAW SETTING (%) | SWITCH K | |
| | 2 | 3 |
| 00 | X | X |
| 10 | X | O |
| 20 | O | X |

X = CONTACT CLOSED
O = CONTACT OPEN

Fig. 3a

| SWITCH A | | | | |
|---|---|---|---|---|
| SPEED SETTING (%) | DECK A | | | |
| | 1 | 2 | 3 | 4 |
| 00 | O | O | O | O |
| 10 | O | O | X | O |
| 20 | O | X | O | O |
| 30 | O | X | O | X |
| 40 | O | X | X | X |
| 50 | X | O | O | O |
| 60 | X | O | X | O |
| 70 | X | O | X | X |
| 80 | X | X | O | X |
| 90 | X | X | X | X |

Fig. 3b

| SWITCH B | | | | |
|---|---|---|---|---|
| SPEED SETTING (%) | DECK B | | | |
| | 1 | 2 | 3 | 4 |
| 0 | O | O | O | O |
| 1 | O | O | X | O |
| 2 | O | X | O | O |
| 3 | O | X | O | X |
| 4 | O | X | X | X |
| 5 | X | O | O | O |
| 6 | X | O | X | O |
| 7 | X | O | X | X |
| 8 | X | X | O | X |
| 9 | X | X | X | X |

Fig. 5

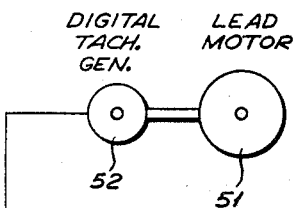

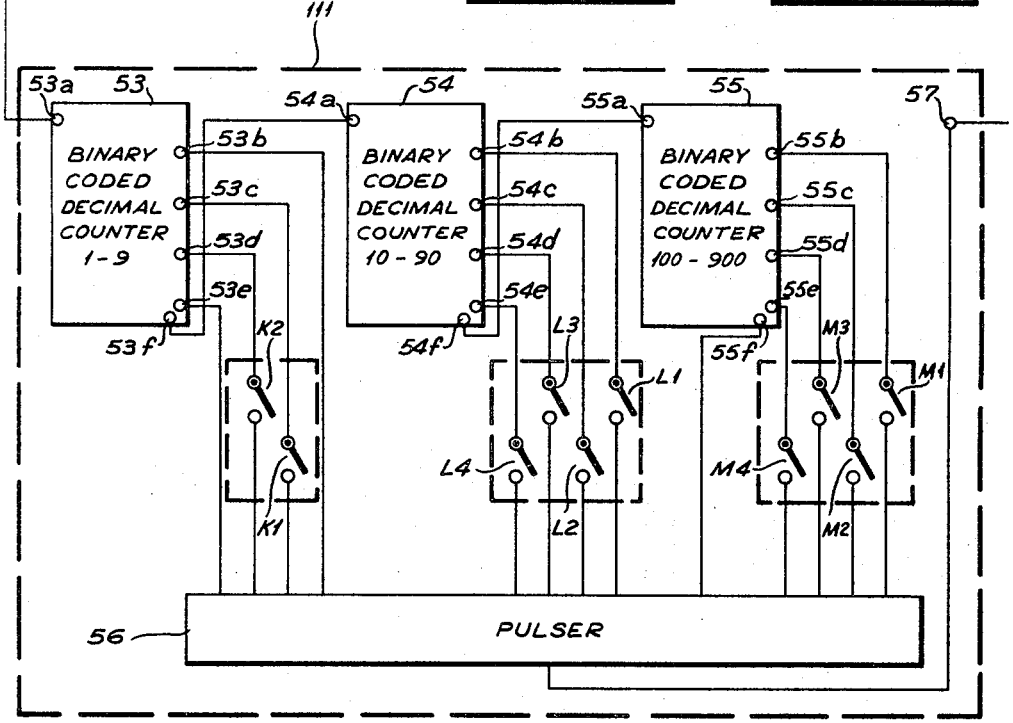

United States Patent Office 3,404,343
Patented Oct. 1, 1968

3,404,343
ADJUSTABLE DIGITAL PULSE DELETERS
Sanford M. Strand, Milwaukee, Wis., assignor to Cutler-Hammer, Inc., Milwaukee, Wis., a corporation of Delaware
Filed June 18, 1964, Ser. No. 376,040
7 Claims. (Cl. 328—42)

ABSTRACT OF THE DISCLOSURE

A digital pulse deleter which when fed with a series of input pulses provides a series of output pulses of uniform amplitude and duration which are selectively less in number by even decrements than a given series of input pulses. Pulses are fed into a digital counter which provides pulses at a plurality of output terminals in a binary coded decimal sequence at a rate in accordance with that of the input pulses. A digital pulser having a plurality of input terminals and a single pulse output terminal through selectable or programmed operator of switch elements interposed between its input terminals and individually associated output terminals of the counter provides a pulse at its output terminal for each pulse received at any of its input terminals that are actively connected to associated counter output terminals.

---

This invention relates to adjustable digital pulse deleters.

While not limited thereto, the circuits of the present invention are particularly suitable for use in digital motor control systems.

Certain applications of electric motors requires that they run in predetermined, fixed speed ratios to another electric motor or machine element. Other applications require selectability of the motor operating speed at different predetermined percentages of some fixed or base speed. Motor control systems of the digital type are well suited for such applications if suitable apparatus is provided to preselect and fix the ratio between the pulses generated by the reference motor, machine element of pulse generator and those fed into the control system of the motor to be regulated. It is a primary object of the present invention to provide novel and simple circuit apparatus for selecting and changing the ratio of pulses fed into the control system of a controlled electric motor in relation to a reference pulse generator which may be either generating pulses at a fixed frequency, or at a frequency in accordance with the speed of another motor or machine element.

Another object is to provide pulse deleting circuits of the aforementioned type utilizing readily available pulse counters suitably connected to subtract or delete any desired numbers of pulses from those fed to it from a reference pulse generator.

A further object is to provide apparatus of the aforementioned type wherein selection of a desired pulse ratio is obtained by closure of one or more of a plurality of switches in accordance with a predetermined schedule.

A still further object is to provide apparatus of the aforementioned type wherein change of pulse ratios is effected in uniform increments and decrements in accordance with operation of switches in a predetermined program cycle.

Other objects and advantages of the invention will hereinafter appear.

The accompanying drawings illustrate preferred embodiments of the invention which will now be described, it being understood that the embodiments illustrated are susceptible of various modifications without departing from the scope of the appended claims.

In the drawings:

FIGS. 3a and 3b are a schedule for operation of switches shown in FIG. 2;

FIG. 5 is a circuit diagram of a portion of the system of FIG. 4; and

FIGS. 6a, 6b and 6c are schedules for operation of switches shown in FIG. 5.

Figure 1:
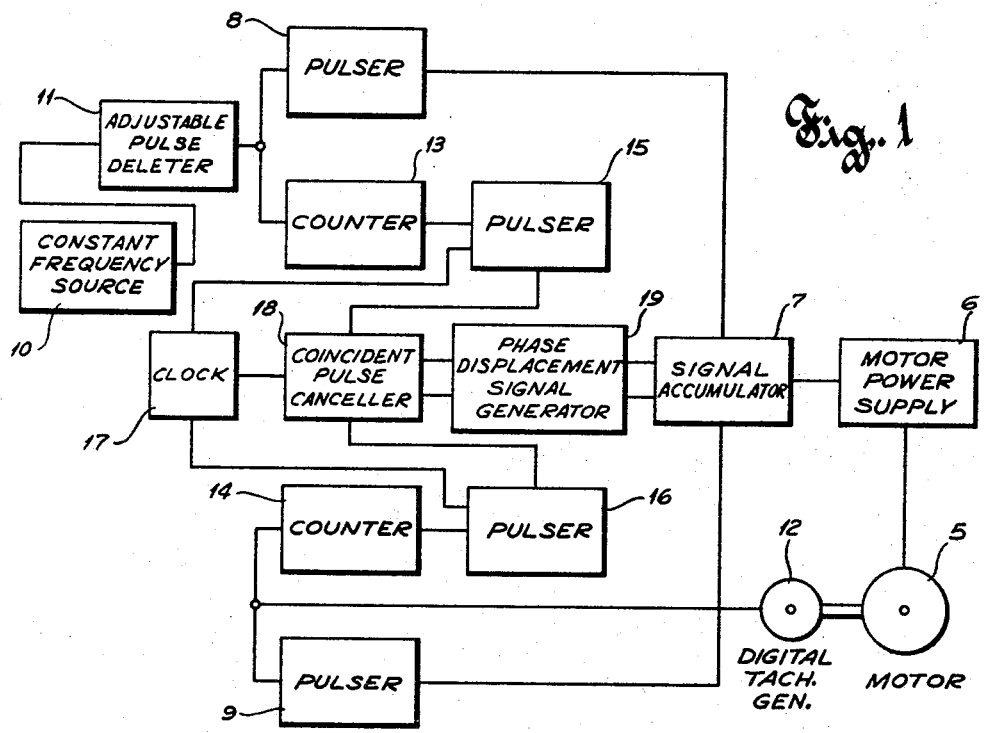
FIGURE 1 is a block diagram of a motor control system incorporating one embodiment of the invention.

The control system of FIG. 1, except for the differences hereinafter described in detail, is similar to that described and claimed in the Strand and Kintner Patent No. 3,331,006, issued July 11, 1967, and assigned to the assignee of the present application. More particularly, it comprises a D.C. motor 5, an adjustable power supply 6, and a signal summer-integrator 7 which provides an analog control voltage to regulate the power output of supply 6 to motor 5.

Summer-integrator 7 is supplied from pulsers 8 and 9 with input pulses of a predetermined amplitude and time period width but varying in frequency. The output frequency of pulses, pulser 8, is determined by input pulses supplied to it from a constant frequency reference pulse generator 10 acting through a pulse deleter circuit 11. The frequency of the pulse output of pulser 9 is determined by the rate of input pulses supplied from a digital tachometer generator 12 driven by the shaft of motor 5. As will hereinafter be more fully described, deleter 11 provides for subtraction of pulses fed thereto in accordance with a predetermined ratio so that pulser 9 receives pulses which bear a fixed, but adjustable relation to those put out by pulse generator 10. The control system as thus far described will provide basic speed regulating control of motor 5 in accordance with pulse output of deleter 11. A detailed description of deleter 11 will follow, but for a basic understanding of how the speed regulating portion of the motor control system functions, reference should be made to the aforementioned Strand and Kintner application.

The control system further comprises pulse counters 13 and 14, pulser-drivers 15 and 16, a synchronous clock 17, a coincident pulse canceler 18, and a phase displacement signal generator 19. Pulses from reference pulse generator 10 are also fed to counter 13 through deleter 11, and counter 14 is fed with pulses from tachometer pulse generator 12. Except for the interposition of deleter 11 between reference pulse generator 10 and pulser 8 and counter 13, the control system is exactly the same as that shown and described in the aforementioned Strand and Kintner application.

Figure 2:
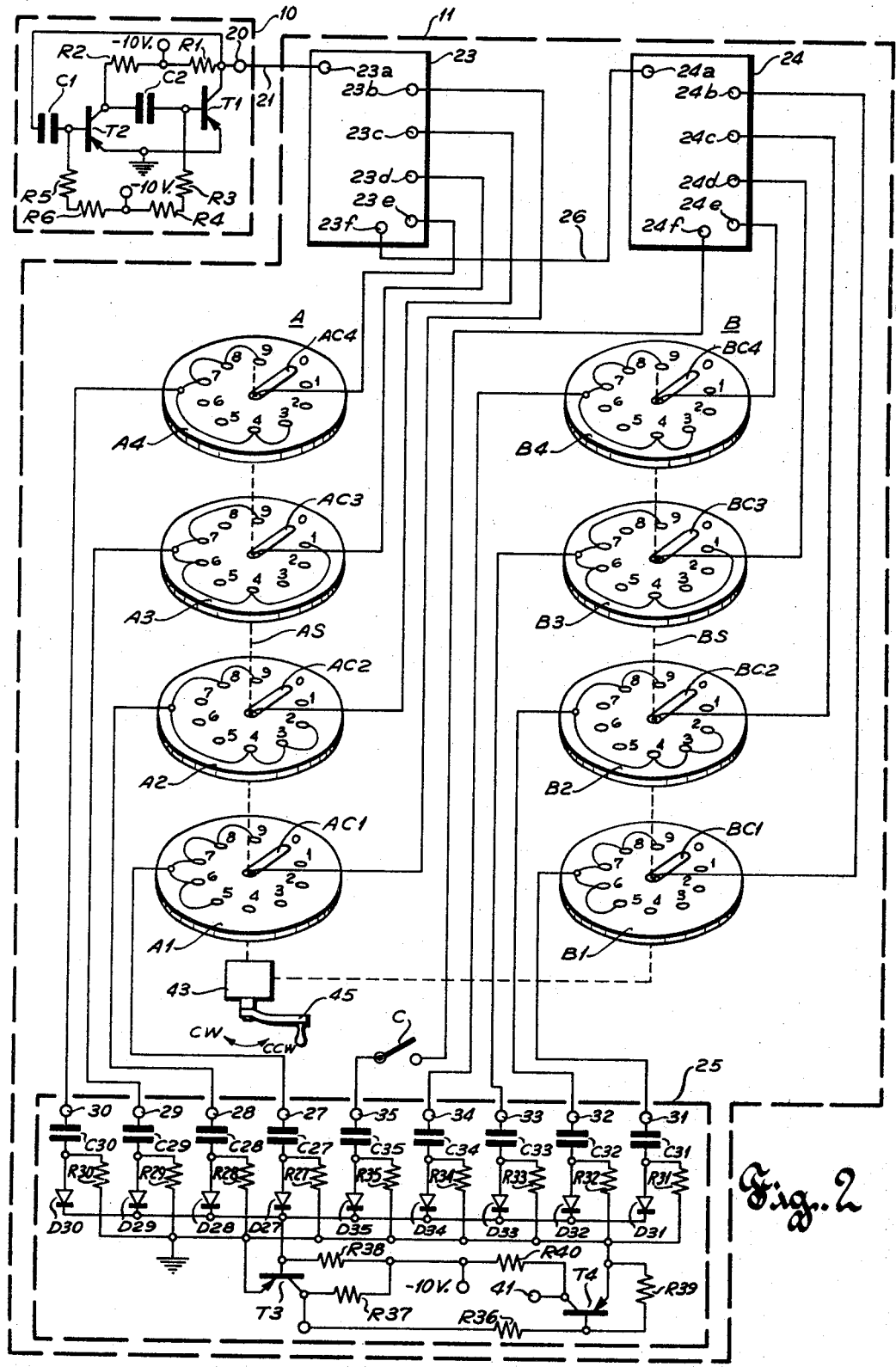
FIG. 2 is a circuit diagram of a portion of the control system of FIG. 1.

FIG. 2 shows the certain details of reference pulse generator 10 and deleter 11. Generator 10 is shown as being a transistor multivibrator having transistors T1 and T2. The emitter of transistors T1 and T2 are both connected to ground and have their collectors connected in series with resistors R1 and R2, respectively, to −10 volts. The collector of T1 is connected to an output terminal 20 and in series with a capacitor C1 to the base of T2. The collector of T2 is connected in series with a capacitor C2 to the base of transistor T1. The base of T1 is connected in series with resistors R3 and R4 to −10 volts, and the base of T2 is similarly connected in series with resistors R5 and R6 to −10 volts. It may be assumed that the circuit constants are selected to provide a suitable frequency rate at output terminal 20.

Output terminal 20 is connected through a conductor 21 to input terminal 23a of deleter 11. Deleter 11 comprises units pulse counter 23, tens pulse counter 24, switches A, B and C and a multiple input pulser 25. Counter 23 has an input terminal 23a and five output terminals 23b to 23f. Counter 24 has an input terminal 24a connected through a conductor 26 to output terminal 23f of counter 23, and has five output terminals 24b to 24f.

Counters 23 and 24 are identical and may be assumed to provide a binary coded decimal sequence of output pulses. They are identical in detail to pulse counters shown and described in the aforementioned Strand and Kintner application.

For each sequence of ten input pulses at input terminal 23a, positive going output voltage fronts or pulses will be provided at output terminal 23b on the 1st, 3rd, 5th, 7th and 9th of a series. Output pulses will be provided at output terminals 23c on the 2nd and 6th of the same series, and output pulses will be provided at terminal 23d on the 4th of such series. An output pulse will be provided at terminal 23e on the 8th pulse and output pulse will be provided at terminal 23f on the 10th input pulse of the series. It will be seen that the output pulses provided at output terminals 24b to 24f will follow a similar schedule for every series of 10 input pulses at input terminal 24a, or 100 input pulses at input terminal 23a.

Output terminals 23b to 23e are respectively connectable through the individual switch decks A1 to A4 of rotary switch A to input terminals 27 to 30 of pulser 25 and output terminals 24b to 24e are respectively connectable through the individual switch decks B1 to B4 of rotary switch B to input terminals 31 to 34, respectively, of pulser 25. Output terminal 24f is connectable through switch C to input terminal 35 of circuit 25. Input terminals 27 to 35 are connected through series connected capacitors and diodes bearing postscript designations corresponding to their associated input terminals (e.g., C27 and D27 for terminal 27), to the base of a transistor T3. The common points between the respective series connected capacitors C27 to C35 and diodes D27 to D35 are connected through one of the resistors R27 to R35 to ground. As will be appreciated, each capacitor-diode pair is a well known type of capacitor-diode gate.

The emitter of transistor T3 is connected to ground and its collector is connected in series with a resistor R36 to the base of a transistor T4. The collector of T3 is also connected in series with a resistor R37 to —10 volts and the base of T3 is connected in series with a resistor R38 to —10 volts. The emitter of transistor T4 is connected to ground and also is connected in series with a resistor R39 to the base of such transistor. The collector of T4 is connected in series with a resistor R40 to —10 volts and to output terminal 41.

The switches A and B are well known forms of multiposition rotary switches. Switch A comprises a plurality of switch decks A1 to A4 which have rotatable contactors AC1 to AC4, respectively, fixed to an operating shaft AS, and switch B similarly comprises switch decks B1 to B4 and rotatable contactors BC1 to BC4 fixed to an operating shaft BS. Each of the decks of switches A and B have ten stationary contacts mounted at equally spaced rotary angles of 36°. Certain contacts of each deck are interconnected together to respective ones of the input terminals 27 to 34 of pulser 25 while others have no electrical connection and can be omitted if desired. The contactors AC1 to AC4 of switch A are connected to output terminals 23b to 23e of counter 23, respectively, while contactors BC1 to BC4 of switch B are connected to output terminals 24b to 24e, respectively. As will hereinafter be explained in detail, operating shafts AS and BS are interconected to a gear box 43, which has an input operating crank 45, to be driven in fixed ratio so that a predetermined sequence of commutation of the various switch decks is carried out.

With all of the switches A, B and C in "open" condition depicted in FIG. 2, transistor T3 will be continuously conducting so that its collector, and hence the base of T4 will be essentially at ground potential. Consequently under such condition transistor T4 will be nonconducting, and hence its collector and output terminal 41 will be at —10 volts. The lower plates of the capacitors C27 to C35 will be at ground potential.

Now let it be assumed that contactor AC1 is closed to contact 5 of deck A1 and reference pulse generator 10 is supplying input pulses to terminal 23a to counter 23. Thus, in each series of ten input positive going voltages at 23a there will be positive going output voltage at terminal 23b on the 1st, 3rd, 5th, 7th and 9th input pulses. Each time there is such an output voltage the upper plate of capacitor C27 shifts —10 volts to ground potential. As the lower plate is then at ground potential, a high transient voltage flows through diode D27 and resistor R38 to —10 volts, thereby momentarily raising the potential of the base of T3 to a value rendering the latter non-conducting. When T3 goes non-conducting, its collector is suddenly shifted from ground potential to essentially —10 volts. This drop in collector potential lowers the potential of the base of terminal T4 to a value rendering the latter conducting to shift its potential from —10 volts to ground potential. By the time the output pulse from 23b ceases, the potential of the base of T3 again raises to a value rendering the latter conducting, and hence T4 non-conducting again.

If only switch deck A1 is completing circuit then only five pulses would appear at output terminal 41 for each ten input positive going voltages at terminal 23a of counters 23. Accordingly, 50% of the input frequency would be deleted and not passed on to pulser 8 and counter 13. Thus the control system of FIG. 1 would operate to maintain a speed of 50% of that dictated by reference generator 10. Looking at the chart of switch commutation in FIG. 3a, where an X indicates switch closure and O indicates open condition of a switch, it will be seen that with switch deck A1 only completing circuit, the indicated speed setting is 50%. Speed settings ranging from 9 to 90% in 10% increments can be obtained for the various combinations of circuit commutations at switch decks A1 to A4 indicated in the schedule of FIG. 3a.

It will be observed that for every ten positive input voltages at terminal 23a there will be a single positive going output pulse at terminal 23f and corresponding input pulse at terminal 24a of counter 24. If circuit completion is at switch deck B1 only then the 10th, 30th, 50th, 70th and 90th of every 100 input pulse at input terminal 23a would effect positive going output pulses at terminal 41. In this last assumed case only 5% of the pulses generated by generator 10 would be passed on to pulser 8 and counter 13. Accordingly, the control system would regulate to 5% of base speed. As shown in the schedule of FIG. 3b, various combinations of circuit commutation at the switch decks B1 and B4 provides for 0 to 9% speed settings in 1% increments. With proper commutation of switch decks A1 to A4, and switch decks B1 to B4 in accordance with the schedule of FIGS. 3a and 3b, any combination of speeds from 0 to 99% base speed can be obtained in 1% increments. This assumes that switch C is open. If switch C is closed and all others are open then the system would regulate to maintain 1% base speed. With all switches closed no input pulses will be deleted and thus the control system will regulate to maintain 100% of base speed.

As aforeindicated, operating shafts AS and BS are rotated by operation of a crank 45 acting through a gear box 43. In one preferred form it may be assumed that the internal mechanism of gear box 43 is designed to provide a 1 to 1 ratio of rotation of shaft BS in the same direction as the rotation of crank 45. It may also be assumed that gear box 43 also contains a single tooth pinion and gear arrangement, or a decade counting wheel operating mechanism. Such mechanisms will afford rotation of shaft AS ⅒ of a revolution each time shaft BS rotates contactors BC1 to BC4 from the contacts 10 to contacts 1 in the clockwise direction, or a corresponding amount in the counterclockwise direction from contacts 1 to contacts 10. Thus in the preferred operating arrangement for switches A and B the contactors AC1 to AC4 of the former advance one contact step during a certain contact step advance of contactors BC1 to BC4 in each revolution of shaft BS.

As will be appreciated, this preferred arrangement of switches A and B affords progressive adjustment in the percentage of pulses deleted from 0 to 100% in steps of 1%. Starting from the position of the containers of switches A and B depicted in FIG. 2, let it be assumed that switch C is closed and that crank 45 is rotated clockwise. As shaft BS rotates contactors BC1 to BC4 will successfully engage contacts 0, 1, 2 and 9 for 324° of shaft revolution. At each successive step in accordance with the schedule of FIG. 3b, the pulses deleted will be decreased in increments of 1% from 99% to 90%. On the last 36° of each revolution of shaft BS in the clockwise direction back to the point depicted in FIG. 2, shaft AS will then rotate 36° to advance its contactors AC1 to AC4 from their contacts 0 to contacts 1. For each ten complete revolutions of crank 45 and shafts BS the pulses deleted will change in step increments from 99% to 0. If switch C is closed, the change would, of course, be from 100% to 1%.

Instead of crank 45, an electrical motor drive having suitable reversing and stop control can be used to operate the switches A and B. A suitable speed reducing gearing might then be used between it and gear box 43, or incorporated with the latter.

Figure 4:
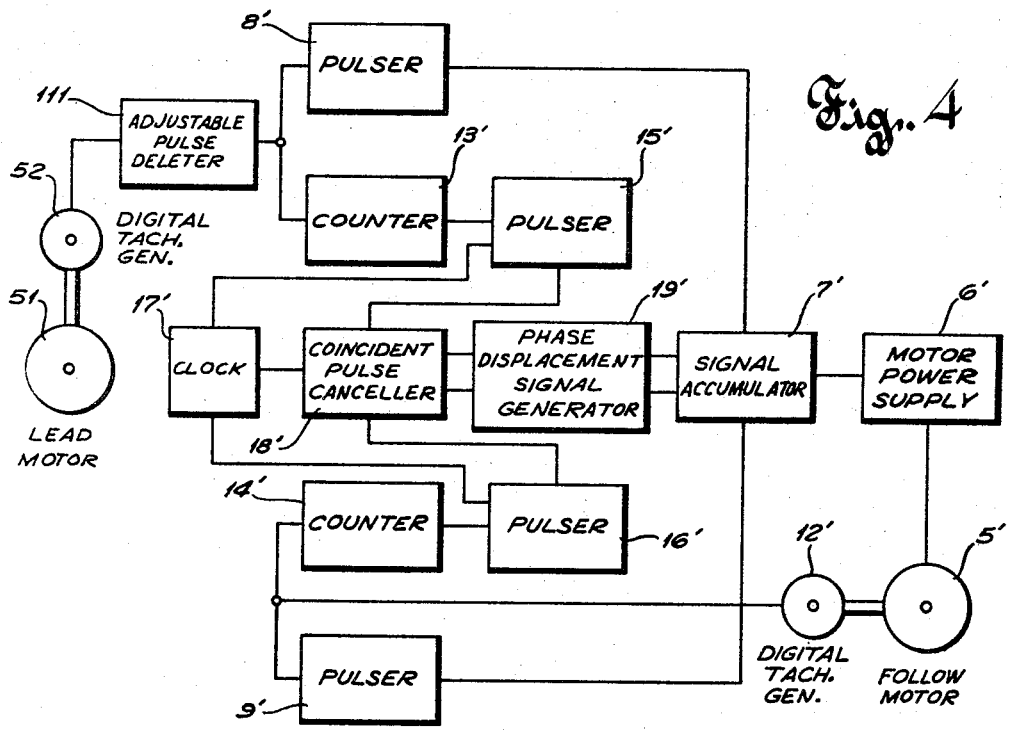
FIG. 4 is a block diagram of a motor control system incorporating another embodiment of the invention.

FIG. 4 shows a modified form of pulse deleter 111 as applied to a control system for a motor 5' that is to be regulated to run at a fixed speed ratio in relation to a lead or master motor 51. Motor 51 drives a digital tachometer generator 52 that supplies pulses to deleter 111 in accordance with the speed of motor 51. All other portions of the control system of FIG. 4 are similar to that of FIG. 2 and bear corresponding primed reference numerals.

Deleter 111 comprises units counter 53, tens counter 54, hundreds counter 55 and multiple input pulser 56. Counter 53 has an input terminal 53a and five count pulse output terminals 53b to 53f. Its output terminal 53f is connected to input terminal 54a of counter 54 which has five count pulse output terminals 54b to 54f. The output terminal 54f is in turn connected to input terminal 55a of counter 55 which has five count pulse output terminals 55b to 55f. Output terminals 53b and 53e are directly connected to pulser 56, output terminals 53c and 53d are connectable to pulser 56 input terminals through switches K1 and K2. Output terminals 54b to 54e of counter 54 are connectable to pulser 56 through switches L1 to L4, respectively, and output terminals 55b to 55e are connectable to pulser 56 through switches M1 to M4, respectively. Pulser 56 may be assumed to have internal circuitry similar to that of pulser 25 aforedescribed in connection with FIG. 2.

It will be seen that with output terminals 53b and 53e permanently connected to pulser 56, a minimum of six output pulses would occur at output 57 of circuit 56 for each series of 10 input pulses at terminal 53a. This would mean that motor 5' would regulate to maintain a speed of 60% of motor 51. Now if switches K1 and K2 are set in accordance with the schedule of FIG. 6c, speed reductions of 10% to 20% can be obtained. It will be seen that every 10th input pulse is fed to input terminal 54a of counter 54. If the switches L1 to L4 are preset in accordance with the schedule of FIG. 6b, then further reductions of 1 to 9% can be obtained. Every 100th output pulse from counter 54 is fed to input terminal 55a of counter 55, so if the switches M1 to M4 are preset in accordance with the schedule of FIG. 6a then further vernier reductions in motor speed in 0.1% increments from 0.1 to 0.9% can be obtained.

By combined presetting of switches K1 and K2, L1 to L4 and M1 to M4 in accordance with the schedule of FIGS. 6a to 6c, pulse deletions in deleter 111 can be made to range from 0.1% to 29.9% of the pulses delivered to it by digital tachometer generator 52 in 0.1% increments. It will be seen that with this range of pulse adjustments motor 5' can be regulated to run at speeds which are in a range of 100% to 70.1% of the speed of motor 51. Regardless of whether motor 51 changes its speed the control system for motor 5' will regulate to maintain its speed at an exact percentage of the speed of motor 51 which is equal to one hundred minus the percentage of input pulses deleted in deleter 111.

It will be apparent to those skilled in the art that the range of possible deletions can be increased considerably by adding switches in the connections between output terminals 53b and 53f of counter 53 and pulser 56. If it is desired to obtain an even finer vernier adjustment of pulse deletion more decade counters, i.e., thousandths, ten thousandths, etc., counters can be added with corresponding additional input circuits for the pulser.

If desired coordinately operated switches, like switches A and B of FIG. 2, can be substituted for thes witches K, L and M to provide a predetermined sequence of commutation so that changes in pulse deletions will occur in a regular stepped order.

It is to be understood that the present invention is not limited to any particular form of pulse counters or counting sequence performed thereby. It is equally usable with counters arranged to count in a straight binary sequence or any other counting system.

I claim:
1. In a pulse deleter, the combination comprising a pulse counter having an input terminal and a plurality of count output terminals, a pulser comprising a plurality of input terminals and a single output terminal which delivers a pulse of given duration and amplitude for each voltage change of a given direction and magnitude impressed at any of its input terminals, means providing separate interconnections between counter output terminals and a like number of pulser input terminals and comprising switch means in one or more of said interconnections, each of said switch means having selectively operable switch elements for closing and opening their associated interconnections, said switch means according to selected closure of individual switch elements rendering one or more of the input terminals of said pulser effective to respond to the count voltage changes occurring at the counter output terminals connected thereto.

2. A pulse deleter according to claim 1, wherein said pulser comprises a first normally conducting transistor, gating means in circuit between each input circuit and the base of said transistor, and a second normally nonconducting transistor having its base in circuit with the output terminal of said first transistor and its output terminal in circuit with said pulser output terminal.

3. A pulse deleter in accordance with claim 1, wherein said counter has four count pulse output terminals, and pulses are provided thereat for each series of ten input pulses in a binary coded decimal sequence.

4. A pulse deleter in accordance with claim 2, together with at least one additional like counter which has its input terminal connected to an output terminal of the first mentioned counter to provide an additional rank of count to obtain pulse deletion increment and decrement percentages equal to one divided by the maximum count registrable by said counters in tandem.

5. A pulse deleter in accordance with claim 2, wherein said gating means are each of the capacitor-diode type and the point common between said capacitors and diodes are connected to a source of constant potential.

6. A pulse deleter according to claim 1, wherein said switch means comprises at least one multi-position, multi-circuit switch and wherein operating means are provided to effect operation of said switch means in a predetermined operation cycle, said switch having its circuits arranged in relation to its operating positions so that upon operation by said operating means the number of pulses effectively passed on through said switch between said counter and said pulse-changes in even increments and decrements for each step change in operating position of said switch.

7. A pulse deleter according to claim 4, wherein said switch means comprises at least two multi-position, multi-circuit switches each of which is connected, respectively, between the output terminals of one of said counters and the input terminals of said pulser and wherein operating means are provided to effect operation of said switches in a programmed cycle in which one switch is operated from any one to another of its operating positions each time the other switch is operated between two predetermined of its operating positions during each cycle of operation of the latter, said switches being internally connected so that each aforedescribed operation of said one switch effects the same incremental or decremental change in the number of pulses developed at the output terminals of said pulser as the sum of the incremental or decremental change effected by operation of said other switch through each complete cycle thereof.

References Cited
UNITED STATES PATENTS

| | | | |
|---|---|---|---|
| 2,519,184 | 8/1950 | Grosdoff | 328—48 |
| 2,909,675 | 10/1959 | Edson | 307—88.5 |
| 2,970,763 | 2/1961 | Freeman | 328—48 X |
| 3,147,442 | 9/1964 | Fritzche et al. | 328—41 |
| 3,201,687 | 8/1965 | Pasquier et al. | 328—48 X |
| 3,241,017 | 3/1966 | Madsen et al. | 328—48 X |

JOHN S. HEYMAN, *Primary Examiner.*